US012654698B2

(12) United States Patent
Somos et al.

(10) Patent No.: US 12,654,698 B2
(45) Date of Patent: Jun. 16, 2026

(54) METHOD AND CONTROL ARRANGEMENT FOR CONTROLLING A SPEED OF A VEHICLE PERFORMING A PULSE AND GLIDE OPERATION

(71) Applicant: Scania CV AB, Södertälje (SE)

(72) Inventors: Oliver Somos, Hägersten (SE); Frank Mohr, Värmdö (SE); David Karlsson, Linghem (SE); Mikael Alenius, Segeltorp (SE)

(73) Assignee: Scania CV AB, Södertälje (SE)

( * ) Notice: Subject to any disclaimer, the term of this patent is extended or adjusted under 35 U.S.C. 154(b) by 109 days.

(21) Appl. No.: 18/598,098

(22) Filed: Mar. 7, 2024

(65) Prior Publication Data

US 2024/0308511 A1     Sep. 19, 2024

(30) Foreign Application Priority Data

Mar. 14, 2023     (SE) ..................................... 2350280-0

(51) Int. Cl.
*B60W 30/14*      (2006.01)
*B60W 30/16*      (2020.01)
         (Continued)

(52) U.S. Cl.
CPC .......... *B60W 30/143* (2013.01); *B60W 30/16* (2013.01); *B60W 30/18072* (2013.01);
         (Continued)

(58) Field of Classification Search
CPC ............... B60W 30/143; B60W 30/16; B60W 30/18072; B60W 50/0097;
         (Continued)

(56) References Cited

U.S. PATENT DOCUMENTS 8,340,884 B1    12/2012   He et al.
2014/0195116 A1    7/2014   Hrovat et al.
         (Continued)

FOREIGN PATENT DOCUMENTS

DE      102016014935 A1    6/2018
IN       201644017127 A    11/2016

OTHER PUBLICATIONS

Scania CV AB, Swedish Patent Application No. 2350280-0, Office Action, Oct. 26, 2023.

*Primary Examiner* — Brodie J Follman

(74) *Attorney, Agent, or Firm* — Moore & Van Allen PLLC; W. Kevin Ransom

(57) ABSTRACT

A method is provided for controlling a speed of a vehicle using a Pulse and Glide (PnG) operation whereby the speed of the vehicle is controlled about a reference speed. The PnG operation comprises a pulse-phase during which the speed of the vehicle is increased to a first speed, higher than the reference speed, followed by a glide-phase during which the speed of the vehicle is allowed to decrease to a second speed, lower than the reference speed. When the PnG operation is being carried out and a speed reduction operation is commenced to decrease the speed lower than the reference speed, the method comprises adjusting the PnG operation such that the speed reduction to the decreased speed is carried out immediately following a speed increase in the pulse-phase to at least the first speed, wherein no propulsive torque is applied during the speed decrease.

16 Claims, 5 Drawing Sheets

200

[210]
Speed reduction to $v_d$ needs to be commenced during PnG operation

[220]
Adjust PnG operation such that a speed reduction is carried out immediatly following a speed increase in the pulse-phase.

(51) Int. Cl.
*B60W 30/18* (2012.01)
*B60W 50/00* (2006.01)

(52) U.S. Cl.
CPC . *B60W 50/0097* (2013.01); *B60W 2510/0657* (2013.01); *B60W 2520/10* (2013.01); *B60W 2552/15* (2020.02); *B60W 2554/802* (2020.02)

(58) Field of Classification Search
CPC ..... B60W 2510/0657; B60W 2520/10; B60W 2552/15; B60W 2554/802; B60W 30/18; B60W 10/04; B60W 30/14; B60W 30/188; B60W 20/12
See application file for complete search history.

(56) References Cited

U.S. PATENT DOCUMENTS

| | | | |
|---|---|---|---|
| 2014/0195135 A1 | 7/2014 | Miyazaki et al. | |
| 2014/0371986 A1 | 12/2014 | Hrovat et al. | |
| 2015/0039203 A1 | 2/2015 | Pedlar et al. | |
| 2015/0291161 A1 | 10/2015 | Amano | |
| 2016/0214606 A1 | 7/2016 | Roos et al. | |
| 2018/0065620 A1 | 3/2018 | Eo et al. | |
| 2020/0361461 A1 * | 11/2020 | Eo et al. | B60W 30/14 |

* cited by examiner

200

[220]
Adjust PnG operation such that a speed
reduction is carried out immediatly
following a speed increase in the pulse-
phase.

200

[210]
Speed reduction to $v_d$ needs to be
commenced during PnG operation

[220]
Adjust PnG operation such that a speed
reduction is carried out immediatly
following a speed increase in the pulse-
phase.

METHOD AND CONTROL ARRANGEMENT FOR CONTROLLING A SPEED OF A VEHICLE PERFORMING A PULSE AND GLIDE OPERATION

CROSS-REFERENCE TO RELATED APPLICATIONS

This application claims priority to Swedish Patent Application No. 2350280-0, filed Mar. 14, 2023, of the same title; the contents of which are hereby incorporated by reference.

TECHNICAL FIELD

The invention relates to a method and a control arrangement for controlling a speed of a vehicle. More specifically, the invention relates to controlling the vehicle speed when a Pulse and Glide (PnG) operation is to be carried out. The invention also relates to a computer program and a computer-readable medium and a vehicle comprising such a control arrangement.

BACKGROUND

The following background description constitutes a description of the background to the invention, which does not, however, necessarily have to constitute prior art.

For motor vehicles, such as cars, trucks and buses, the power consumption constitutes a significant expense for the vehicle's owner or user. For a hauling company, the main expenditure items for the day-to-day operation of a vehicle consist, apart from the cost of acquisition of the vehicle and the vehicle's driver's salary, of costs of repair and maintenance and fuel for the propulsion of the vehicle. The fuel cost may impact the profitability of the hauling company to a great extent. Therefore, a number of different driving techniques have been developed to reduce power consumption.

One example of such energy efficient driving technique is Pulse and Glide (PnG) used to improve the efficiency of a vehicle by reducing its energy consumption. During a PnG operation a vehicle is first accelerated to a maximum target speed, thereby gaining kinetic energy. Such initial acceleration is referred to as a pulse-phase of the PnG operation. This energy is then used to propel the vehicle during a glide phase, where the speed of the vehicle is allowed to decrease to a minimum target speed without any propulsive power from the vehicle's drive unit. During the pulse-phase of the PnG operation, the drive unit is typically operating in a less efficient power state with higher rotational speed resulting in higher frictional losses in the vehicle's driveline. On the other hand, during the glide-phase the drive unit is typically turned off or idling, which reduces these internal frictional losses. During a PnG operation, the vehicle spends more time in the state of low friction losses i.e. in the glide-phase, and less time in the state of high friction losses, i.e., in the pulse-phase resulting in lower energy consumption compared to travelling at a constant speed.

Due to conditions interfering with the current PnG operation, such as e.g. a coming speed change, using PnG is not always possible. There is thus a need to improve the current PnG implementation such that the usage of PnG can be increased resulting in the energy efficiency being further increased.

SUMMARY

It is an objective of the present invention to provide methods and control arrangement for mitigating or solving drawbacks of conventional solutions.

According to a first aspect of the invention, aforementioned and further objectives are achieved through a method performed by a control arrangement for controlling a speed of a vehicle, the vehicle being configured for carrying out a Pulse and Glide (PnG) operation, the PnG operation controlling the speed of a vehicle about a reference speed, and comprising a pulse-phase during which the speed of the vehicle is increased to a first speed, higher than the reference speed, followed by a glide-phase during which the speed of the vehicle is allowed to decrease to a second speed, lower than the reference speed, the method comprising, when the PnG operation is to be carried out, and when a speed reduction to a decreased speed, lower than the reference speed, is to be commenced during the PnG operation:

adjusting the PnG operation such that the speed reduction to the decreased speed is carried out immediately following a speed increase in the pulse-phase to at least the first speed, wherein no propulsive torque is applied during the speed decrease.

It is to be understood that the reference speed in the vehicle travelling in a PnG operation mode refers to a target speed that the vehicle aims to maintain during this driving technique. Normally, during a PnG operation the vehicle speed alternates, during the pulse- and glide-phase, between a maximum target speed and a minimum target speed set around the reference target speed. Thus, the maximum target speed and the minimum target speed of the PnG operation as well as the durations of the pulse- and glide-phase depend on the reference speed.

A conventional PnG operation comprises, in the context of the invention, one pulse-phase during which the speed of the vehicle is increased from the reference speed to the first speed and one glide-phase during which the speed of the vehicle is decreased from the first speed to the second speed. Moreover, the PnG operation comprises a return pulse, commencing immediately after the glide-phase has ended, i.e., when the vehicle speed has been decelerated to the second speed, in which the vehicle is accelerated from the second speed to the reference speed, whereupon the PnG operation ends. When travelling in a PnG operation mode, one or two or more consecutive PnG operations may be performed.

It is to be understood that the speed reduction to the decreased speed, which is to be commenced during the PnG operation, is, in the context of the invention, a speed decrease from the vehicle reference speed i.e. a speed reduction performed when the reference speed has been, or is to be, reduced. A position and/or a timing of commencing such a speed reduction may be determined in the vehicle according to conventional methods and may depend on the reference speed of the vehicle, the required size of the speed reduction and at least one vehicle operating condition such as road condition, traffic flow, and vehicle capabilities.

According to previous known methods, when a speed decrease from the reference speed is to be commenced during an ongoing or an anticipated PnG operation, the PnG operation may be skipped or interrupted, irrespectively of where in the PnG operation the vehicle currently is, which may cause various disadvantages. In case the PnG operation is skipped, the energy saving advantages of the PnG operation are lost. On the other hand, interruption of the PnG operation may lead to reduced driving comfort due to rapid or abrupt changes in vehicle speed and acceleration and uncomfortable propulsive torque when the interrupted PnG operation if followed by the speed reduction as will be explained further on in this disclosure. Therefore, it is important to minimize interruptions of a PnG operation whenever possible.

Unlike previous known methods, the invention does not terminate nor interrupt the PnG operation which is to be carried out when the speed decrease is to be commenced in such a way that the above mentioned disadvantages are encountered. Instead, the invention adjusts the PnG operation such that the speed reduction to the decreased speed is carried out immediately following a speed increase in the pulse-phase to at least the first speed. Here, the at least the first speed is a speed equal to the first speed or a speed higher than the first speed.

Moreover, the speed reduction is performed such that no propulsive torque is applied during the glide-phase. The PnG operation is adjusted in such a way that after reaching the at least first speed during the pulse-phase of the adjusted PnG operation, the speed of the vehicle may be reduced from the first speed to the decreased speed during a continuous speed reduction. In other words, the pulse-phase of the adjusted PnG operation is adjusted to reach the at least first speed at the exact time instance or position where the speed of the vehicle needs to be reduced to reach the decreased speed at a required position. The required position may here relate to the position where the decreased speed is to be reached. Hereby, the risk of jerky movements of the vehicle caused by rapid changes in the vehicle acceleration due to short periods of propulsive torque may be avoided resulting in improved driver comfort.

In an embodiment of the invention, the speed reduction to the decreased speed may be carried out by the glide-phase commencing immediately following the speed increase in the pulse-phase to at least the first speed. The speed of the vehicle may thus be reduced to the decreased speed during the adjusted glide-phase.

In other words, the invention adjusts the PnG operation to enable a speed reduction to the decreased speed such that the decreased speed may be reached at the required position. The speed reduction is here carried out by means of a glide-phase from at least a first speed to the decreased speed immediately following the pulse-phase of the adjusted PnG operation. The invention adjusts the start of the glide-phase so that the speed of the vehicle is allowed to decrease to the decreased speed and reach the decreased speed at the required position without any propulsive power from the vehicle's drive unit. Hereby, the adjusted PnG operation is performed without being terminated or interrupted, resulting in decreased energy consumption. Moreover, the risk of jerky movements of the vehicle caused by rapid changes in the vehicle acceleration may be further reduced and the driver comfort further improved.

In an embodiment of the invention, the speed reduction to the decreased speed is carried out by the glide-phase commencing immediately following the speed increase in the pulse-phase to at least the first speed transitioning into the speed reduction to the decreased speed.

In other words, the invention adjusts the PnG operation so that the speed of the vehicle may be reduced to reach the decreased speed exactly at the required position. Here, the decreased speed is reached by means of the glide-phase reaching the reference speed at exactly the position where the speed reduction to the decreased speed is to be commenced, whereafter the anticipated speed reduction to the decreased speed is performed. The speed reduction from the reference speed may thus by performed as a sequence of speed reductions without interruption, from at least the first speed to the decreased speed. Hereby, the risk of jerky movements of the vehicle caused by rapid changes in the vehicle acceleration may be further reduced and the driver comfort further improved.

In an embodiment of the invention, the reference speed is a set vehicle speed and the reduction of the vehicle speed to the decreased speed is to be performed when the set vehicle speed is reset to the decreased speed or when the vehicle is approaching a downhill road section.

The set speed may be set by a vehicle operator or automatically according to conventional methods. The set speed may for example be based on legal speed limits along the route of the vehicle. A reduction of the vehicle speed may be commenced due to a new, lower set vehicle speed or as an automatic speed reduction function e.g., when approaching a downhill road section. The set vehicle speed being reset to the decreased speed may here refer to the set vehicle speed being set to a value lower than the current set speed resulting in a reduction of the vehicle speed. Reduction of the vehicle speed when approaching a downhill road section is often applied by fuel efficient automatic speed control functions. Reducing the speed of the vehicle may reduce the need of using brakes when the vehicle is accelerated in the downhill road section. Braking causes the vehicle to lose kinetic energy, which needs to be regained by the vehicle drive unit, thereby consuming energy. Hereby, the speed of the vehicle may be controlled in a smooth and energy efficient manner when the vehicle speed needs to be reduced due to changes in the road conditions, for comfort or efficiency reasons.

In an embodiment of the invention, the adjusting of the PnG operation comprises, when the PnG operation is to be commenced at a first point in time, adjusting the point in time when the adjusted PnG operation is to be commenced such that the speed reduction to the decreased speed is carried out immediately following the speed increase in the pulse-phase to at least the first speed.

It is to be understood that, in the context of the invention, the PnG operation commences with a pulse-phase during which the vehicle is accelerated to the first vehicle speed. Thus, adjusting the point in time when the adjusted PnG operation is to be commenced may here be understood as adjusting the point in time of commencing the pulse-phase, resulting in that the point in time when the at least first speed is reached during that pulse-phase will also be adjusted. The point in time of commencing the adjusted PnG operation may be adjusted such that the at least first speed will be reached during the pulse-phase as to coincide with the speed reduction to the decreased speed from the first speed. As previously described, the decreased speed may be reached by means of the glide-phase commencing immediately following the speed increase in the pulse-phase to at least the first speed. Hereby, previously described advantages are obtained.

In an embodiment of the invention, the adjusting of the point in time when the adjusted PnG operation is to be commenced comprises commencing the adjusted PnG operation at a later point in time than the first point in time.

Hereby, the point of time of commencing the PnG operation may be calibrated to match the timing of the anticipated speed reduction to the decreased speed such that the speed reduction may be performed in a smooth and energy efficient manner.

In an embodiment of the invention, the PnG operation comprises a pulse-phase with a first duration, and the adjusting of the PnG operation comprises adjusting the duration of the pulse-phase such that the reduction of the speed to the decreased speed commences immediately following a speed increase in the adjusted pulse-phase to at least the first speed.

It is to be understood that in addition to comprising the pulse-phase with a first duration the PnG operation also comprises a glide-phase with a second duration. By adjusting the duration of the pulse-phase, reaching the at least first speed during the pulse-phased may be calibrated to match the timing of the anticipated speed reduction to the decreased speed such that the speed reduction may be performed in a smooth and energy efficient manner.

In an embodiment of the invention, the adjusting of the duration of the pulse-phase comprises increasing or decreasing the duration of the pulse-phase compared to the first duration.

Increasing the duration of the pulse-phase may be achieved by decreased acceleration of the vehicle during the pulse-phase compared to conventional pulse-phase. In similar fashion, decreasing the duration of the pulse-phase may be achieved by an increased acceleration of the vehicle during the pulse-phase compared to a conventional pulse-phase. Another way of adjusting the duration of the pulse-phase may comprise adjusting the maximum target speed.

In an embodiment of the invention, the adjusting of the duration of the pulse-phase comprises increasing the speed of the vehicle to a speed above the first speed.

Increasing the speed of the vehicle above the first speed during the pulse-phase may be done by increasing maximum target speed of the vehicle and will result in in increased duration of the pulse-phase. Hereby, the duration of the pulse-phase may be efficiently calibrated to meet the forthcoming speed reduction to the decreased speed.

In an embodiment of the invention, the method further comprises determining whether the speed reduction to the decreased speed will need to be commenced during the PnG operation at least partly based on information related to an upcoming road section for the vehicle.

Hereby, a future speed reduction may be predicted in a reliable and correct manner and taken into account when adjusting the vehicle speed in an energy efficient way, reducing the need for excessive braking of acceleration and enable increased usage of PnG operation.

In an embodiment of the invention, the information related to the upcoming road section is obtained from at least one of:

map data for the upcoming road section, at least one sensor in the vehicle, and/or information received from an external entity.

Hereby, detailed information related to the upcoming road section such as location of turns, road gradient, intersections, road signs etc. can be provided in an accurate way allowing the vehicle's speed to be controlled in a correct and safe way.

In an embodiment of the invention, the adjusting of the PnG operation is further based on a position where the decreased speed is to be reached.

Hereby, the PnG operation may be correctly adjusted leading to increased energy efficiency and/or improved driving experience.

In an embodiment of the invention, a second vehicle is travelling in front of the vehicle, wherein the first speed and the second speed depend on a set distance interval to be maintained to the second vehicle in front of the vehicle.

Hereby, the above mentioned advantages may be obtained when the speed of the vehicle is controlled to maintain a safe speed to a vehicle in front. Hereby, energy efficiency is further increased and/or the driving experience is further improved.

According to a second aspect, the invention relates to a control arrangement for controlling a speed of a vehicle, the vehicle being configured for carrying out a PnG operation, the PnG operation controlling the speed of a vehicle about a reference speed, and comprising a pulse-phase during which the speed of the vehicle is increased to a first speed, higher than the reference speed, followed by a glide-phase during which the speed of the vehicle is allowed to decrease to a second speed, lower than the reference speed, the control arrangement being configured to, when the PnG operation is to be carried out, and when a speed reduction to a decreased speed, lower than the reference speed, is to be commenced during the PnG operation:

adjust the PnG operation such that the speed reduction to the decreased speed is carried out immediately following a speed increase in the pulse-phase to at least the first speed, wherein no propulsive torque is applied during the speed decrease.

It will be appreciated that all the embodiments described for the method aspects of the invention are applicable also to at least one of the control arrangement aspects of the invention. Thus, all the embodiments described for the method aspects of the invention may be performed by the control arrangement, which may also be a control device, i.e. a device. The control arrangement and its embodiments have advantages corresponding to the advantages mentioned above for the methods and their embodiments.

According to a third aspect of the invention, aforementioned and further objectives are achieved through a vehicle comprising the control arrangement of the second aspect.

According to a fourth aspect, the invention relates to a computer program comprising instructions which, when the program is executed by a computer, cause the computer to carry out the method according to the first aspect.

According to a fifth aspect, the invention relates to a computer-readable medium comprising instructions which, when executed by a computer, cause the computer to carry out the method according to the first aspect.

BRIEF DESCRIPTION OF THE DRAWINGS

Embodiments of the invention will be illustrated in more detail below, along with the enclosed drawings, where similar references are used for similar parts, and where.

DETAILED DESCRIPTION

Pulse and Glide (PnG) is a technique for controlling a speed of a vehicle which is conventionally used to improve energy efficiency by alternating between periods of accelerations and periods of coasting/freewheeling. Conventional PnG technique interacts only in a limited way with speed decrease situations. An upcoming speed decrease along the vehicle route may result in a PnG operation being skipped or interrupted since there is not enough time to complete the operation before the upcoming speed decrease is to be performed. The energy saving benefits of the PnG operation will be lost in case the PnG operation is skipped. On the other hand, the driving experience may become less comfortable when a PnG operation is interrupted or finished very close to an upcoming speed reduction leading to unexpected short periods of propulsive torque, causing a jerky ride.

It is therefore an objective of the present invention to provide a method and a control arrangement for controlling a speed of a vehicle when a PnG operation is to be carried out, and when a speed reduction to a decreased speed is to be commenced, such that these problems are at least partly solved.

Figure 1:
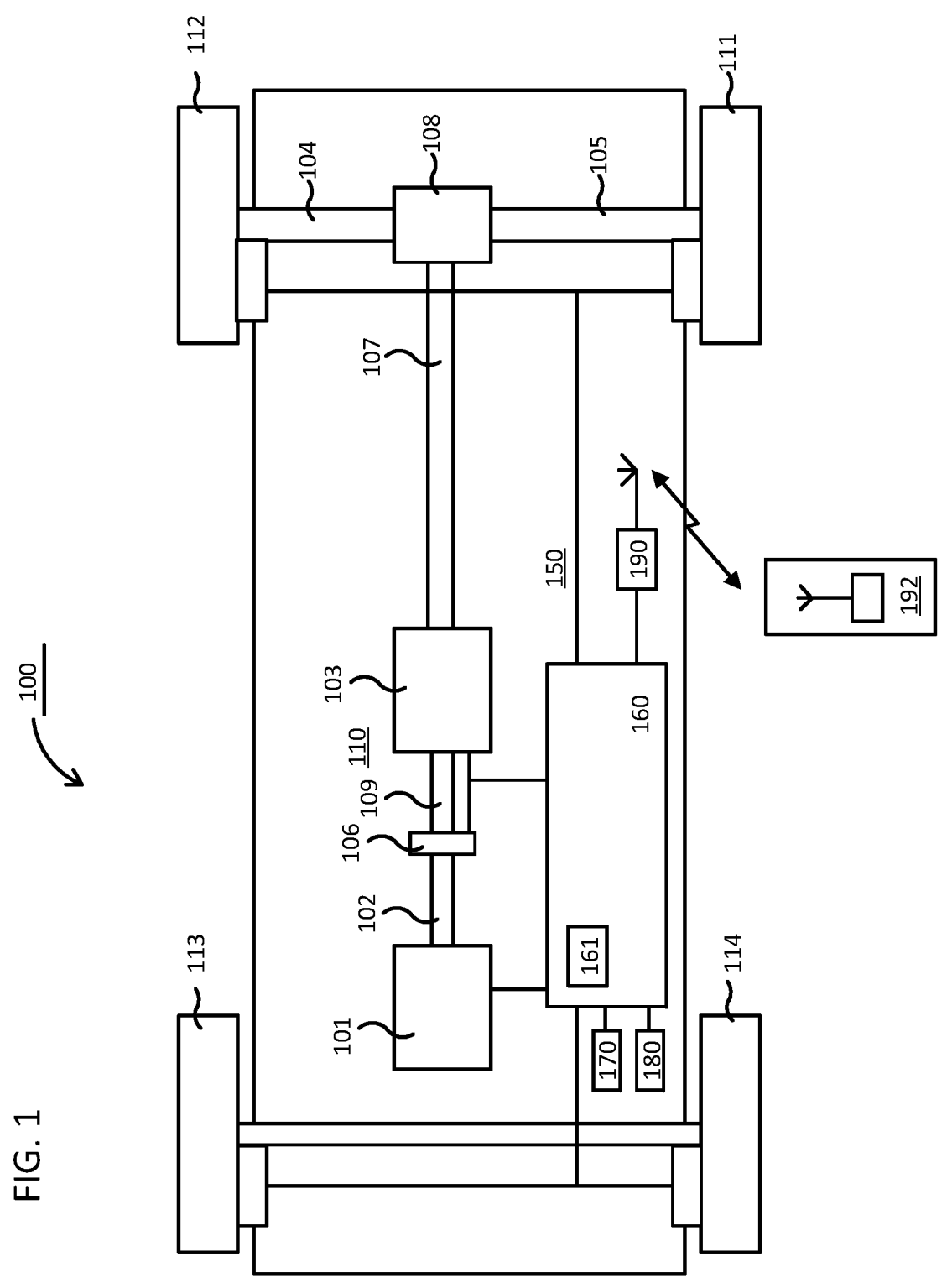
FIG. 1 shows an example vehicle, in which embodiments of the present invention may be implemented.

FIG. 1, which will be used to explain the herein presented embodiments, schematically shows an exemplary vehicle 100, such as a truck. The embodiments are, however, not limited for use in vehicles as the vehicle shown in FIG. 1, but may also be used in lighter vehicles, such as smaller trucks, cars and other vehicles.

The vehicle 100 comprises a pair of drive wheels 111, 112 and at least one other pair of wheels 113, 114. The vehicle furthermore comprises a driveline/drivetrain 110 configured to transfer a torque between at least one power source 101, such as e.g. an engine, and the drive wheels 111, 112. The at least one power source 101 may include a combustion engine, at least one electrical machine, or a combination of these, implementing a so-called hybrid drive.

The at least one power source 101 is e.g. in a customary fashion connected, via an output shaft 102 of the power source 101, to a clutch 106, and via the clutch also to a gearbox 103. The torque provided by the power source 101 is provided to an input shaft 109 of the gearbox 103. A propeller shaft 107, connected to an output shaft of the gearbox 103, drives the drive wheels 111, 112 via a central gear 108, such as e.g. a customary differential, and drive shafts 104, 105 connected with the central gear 108. Also, one or more electrical machines may be arranged essentially anywhere along the driveline 110, as long as torque is provided to one or more of the wheels 111, 112, 113, 114, e.g. adjacent to one or more of the wheels 111, 112, 113, 114, as is understood by a skilled person. The drive train may also be of various different designs.

The vehicle 100 may also comprise a control arrangement 160. The control arrangement 160 may be distributed on several control units configured to control different parts of the vehicle 100. The control arrangement 160 may e.g. include a an adjusting unit 161 arranged for performing the method steps of the disclosed invention as is explained further. The control arrangement 160 may further be configured for controlling one or more of the at least one power source 101, the clutch 106, the gearbox 103, and/or any other units/devices/entities of the vehicle 100. However, in FIG. 1, only the units/devices/entities of the vehicle 100 useful for understanding the invention are illustrated. The control arrangement 160 will be described in further detail in FIG. 4.

The vehicle 100 may further include one or more sensors 170, e.g., at least one camera located at suitable positions within the vehicle 100.

Further, the vehicle 100 may comprise a positioning system/unit 180. The positioning unit 180 may be based on a satellite navigation system such as the Navigation Signal Timing and Ranging (Navstar), Global Positioning System (GPS), Differential GPS (DGPS), Galileo, GLONASS, or the like. Thus, the positioning unit 180 may comprise a GPS receiver.

The vehicle 100 may further include at least one communication device 190 arranged for communication with at least one entity 192 external to the vehicle 100, such as e.g. an infrastructure entity, an external server and/or a positioning information entity.

According to various embodiments of the invention, the at least one communication device 190 may be essentially any device transferring information to and/or from the vehicle 100, and the at least one entity 192 external to the vehicle 100 may be essentially any external entity communicating with the vehicle 100, i.e. with the at least one communication device 190, for the transfer of the information to and/or from the vehicle 100. The at least one communication device 190 may be a vehicle-to-vehicle (V2V) communication device, a vehicle-to-infrastructure (V2I) communication device, a vehicle-to-everything (V2X) communication device, and/or a wireless communication device such that communication between the vehicle 100 and the at least one external entity 192 is achieved/provided.

Figures 2A, 2B:
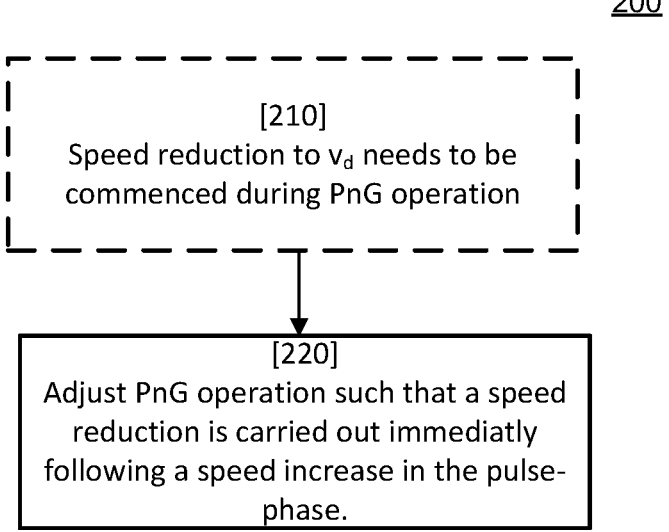
FIG. 2a shows a flow chart of a method for controlling a speed of a vehicle according to embodiments of the invention.
FIG. 2b shows a flow chart of a method for controlling a speed of a vehicle according to further embodiments of the invention.

The proposed solution will now be described with reference to a method 200 disclosed in FIG. 2a and the vehicle 100 disclosed in FIG. 1. FIG. 2a illustrates a flow chart of the method 200 performed by a control arrangement 160 for controlling a speed of a vehicle 100, the vehicle 100 being configured for carrying out a PnG operation, the PnG operation controlling the speed of a vehicle about a reference speed. The PnG comprises a pulse-phase during which the speed of the vehicle 100 is increased to a first speed $v_1$, higher than the reference speed, followed by a glide-phase during which the speed of the vehicle 100 is allowed to decrease to a second speed $v_2$, lower than the reference speed. The method 200 comprises, when the PnG operation is to be carried out, and when a speed reduction to a decreased speed $v_d$, lower than the reference speed, is to be commenced during the PnG operation:

in step 220 adjusting the PnG operation such that the speed reduction to the decreased speed $v_d$ is carried out immediately following a speed increase in the pulse-phase to at least the first speed $v_1$, wherein no propulsive torque is applied during the speed decrease.

In other words, when the method 200 is performed, the speed of the vehicle 100 is maintained between a maximum target speed and a minimum target speed by carrying out a PnG operation and thus alternating the vehicle speed between the maximum target speed, here set to the first speed $v_1$ and the minimum target speed, here set to the second speed $v_2$. The maximum target speed and the minimum target speed may be set by the vehicle operator or automatically in the control arrangement 160. Moreover, the method 200 is performed when the maintained vehicle speed is to be reduced to a decreased speed $v_d$ and wherein the speed reduction is to be commenced during the PnG operation. The decreased speed $v_d$ is to be understood as a speed lower than the reference speed which the PnG operation aims to maintain, and which is lower that the first speed $v_1$.

In an embodiment, the method 200 may be applied in a driving situation when a second vehicle is travelling in front of the vehicle 100 and wherein the first speed $v_1$ and the second speed $v_2$, depend on a set distance interval to be maintained to the second vehicle in front of the vehicle 100.

In other words, the method of the invention may be applied when the speed of the vehicle is controlled automatically based on information related to upcoming traffic conditions to maintain a safe following distance to a vehicle in front in cases when such safe following distance is maintained by means of a PnG operation.

In previous known systems, the speed of the vehicle 100 would be controlled such that the PnG operation would have been skipped or interrupted in cases when the upcoming speed reduction is anticipated during the PnG operation. The present invention instead adjusts the PnG operation such that an adjusted PnG operation is performed prior to the speed reduction to the decreased speed $v_d$ and such that the adjusted PnG meets the upcoming speed reduction without any need to apply propulsive torque during the speed reduction. This results in increased energy efficiency and/or improved driving experience and comfort.

Figure 3A:
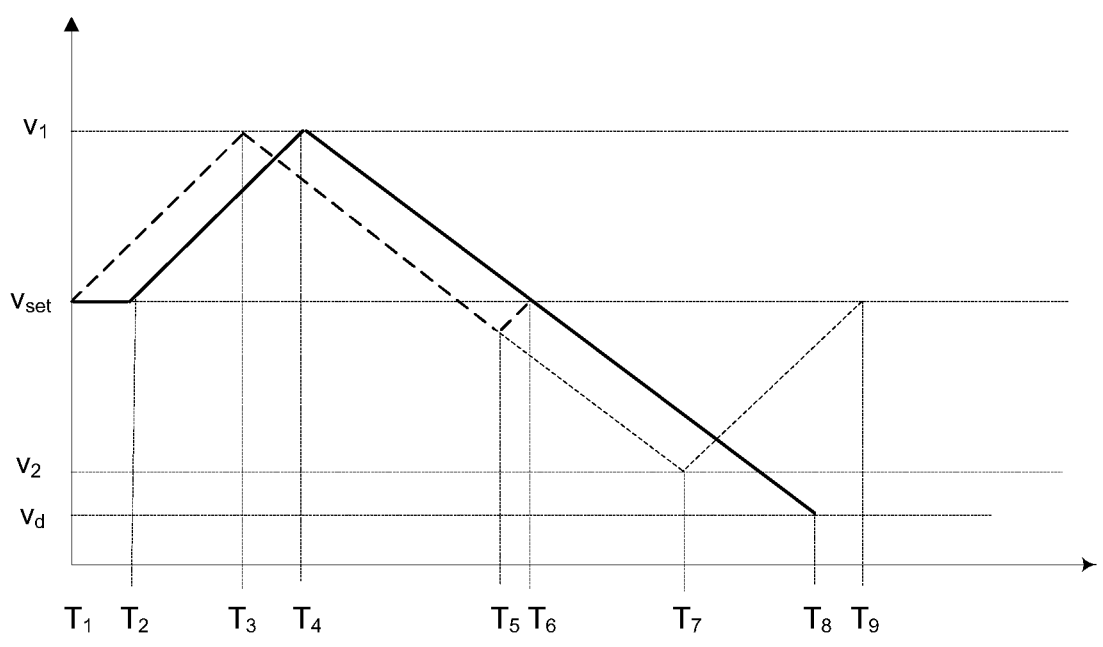
FIG. 3a illustrates a non-limiting example of controlling a speed of a vehicle according to embodiments of the invention.

The previous known method and the method according to the invention are illustrated schematically in the non-limitative example in FIG. 3a. It is to be understood that the examples in FIG. 3a, as well as in other figures in this disclosure are explained by using points in time, such as time instances, along with periods of time and time durations to explain the invention. It should however be appreciated that points in time and periods of time as well as positions and sections respectively constitute different units used to describe one and the same sequence of events according to the invention.

A vehicle, such as the previously described vehicle 100, is here driving along a route while its speed is controlled automatically by a control arrangement, such as the previously described control arrangement 160. Such automatic speed control may be, for example, performed by means of a cruise control function configured to maintain a reference speed. The reference speed may, in one example, be set by the driver of the vehicle 100. In another example, such reference speed may be set automatically according to conventional methods, based, e.g., on legal speed limits along the route of the vehicle 100, and the curvature of the road section in front of the vehicle. Thus, the cruise control function may, in one example, be an adaptive cruise control configured to detect information related to a coming road section and to automatically adjust the speed of the vehicle based on such information. Moreover, the vehicle may be configured to carry out a PnG operation, i.e., to maintain the reference speed.

The speed of the vehicle 100 during the PnG operation may, for example, be maintained within a speed interval about a set vehicle speed $v_{set}$, wherein the speed interval being between the first speed $v_1$ and the second speed $v_2$, lower than the first speed $v_1$, as illustrated in FIG. 3a. As previously explained, the first speed $v_1$ may correspond to a maximum target speed and the second speed $v_2$ to a minimum target speed that the vehicle may be configured to maintain. The set speed as well as the maximum target speed and the minimum target speed may be set by the vehicle operator or automatically in the control arrangement 160. According to a non-limitative example, the vehicle operator may set a set speed to 80 km/h whereafter the maximum target speed and the minimum target speed are set automatically to values around the set speed e.g., to the set speed +/−3 km/h. Note that the maximum target speed and the minimum target speed around the vehicle set speed do not need to be set in symmetrical manner.

In FIG. 3a, the vehicle speed controlled according to previous known methods, i.e., when the set vehicle speed $v_{set}$ is maintained by means of a conventional PnG operation, is illustrated by the dashed line. The speed of the vehicle is thus increased from the set vehicle speed $v_{set}$ during the pulse-phase of the PnG operation, between the time instance $T_1$ and the time instance $T_3$ and reach the first speed $v_1$, higher than the set speed $v_{set}$. The vehicle speed is then allowed to decrease during a glide-phase between the time instance $T_3$ and the time instance $T_7$ from the first speed $v_1$ to a second speed $v_2$, lower than the set speed $v_{set}$. The glide-phase of conventional PnG operation is followed by a return pulse where the vehicle is accelerated to the set vehicle speed $v_{set}$ between the time instance $T_7$ the time instance $T_9$.

During the pulse-phase, the vehicle is accelerated by means of a propulsive power obtained from the vehicle's drive unit 101 to a first speed $v_1$ exceeding the set speed $v_{set}$, thereby gaining kinetic energy. During the glide-phase, the vehicle 100 enters a state of low friction so as to maintain the vehicle speed in a speed interval around the set speed $v_{set}$ while consuming as little energy as possible. Thus, the speed of the vehicle 100 during the glide-phase may be controlled by allowing the vehicle to coast or freewheel by disconnecting the drive wheels from the drive unit 101 by means of open clutch or in neutral. During this phase, the vehicle may thus use the kinetic energy gained during the preceding pulse-phase for propulsion while no propulsive power is provided by the vehicles drive unit 101. The speed of the vehicle may vary during the glide-phase, depending on forces acting on the vehicle such as gravity, resistive forces such as friction, drag from wind resistance and may not necessarily involve a continuous speed reduction.

The PnG operation may be followed by one, two or more PnG operations aiming to maintain the set speed $v_{set}$ in an energy efficient way. However, in the driving scenario shown in FIG. 3a, the speed of the vehicle is to be reduced at the time instance $T_8$ to a decreased speed $v_d$.

In an embodiment, the reduction of the vehicle speed to the decreased speed $v_d$ may be performed when the set vehicle speed is reset to the decreased speed $v_d$ or when the vehicle is approaching a downhill road section. It is to be understood that a position or a time instance of commencing such an approaching speed decrease is known in the vehicle's control arrangement 160 and may be used when controlling the vehicle speed according to the method of the invention as will be explained in more detail further on in this disclosure. Alternatively, the vehicle speed according to the method of the invention may instead be based on the position or the time instance where the decreased speed is to be reached as will be explained further on.

The decreased speed $v_d$, may be a speed lower than the reference speed, i.e., lower than the set speed $v_{set}$. Typically, the decreased speed $v_d$ may be substantially lower than the second speed $v_2$. As illustrated in FIG. 3a, reaching the decreased speed $v_d$ at the time instance $T_8$ may be done by commencing a speed reduction from the set speed $v_{set}$ to the decreased speed $v_d$ at the time instance $T_6$. Such speed reduction may preferably be performed by means of an energy efficient speed reduction technique i.e., when no brake power is applied. It is to be understood that a position and/or a point in time when the speed decrease to the decreased speed $v_d$ is to be reached or when the speed reduction to the decreased speed $v_d$ is to be commenced is available in the vehicle's control arrangement 160 or may be determined to be used when controlling the vehicle speed according to the method of the invention as will be explained in more detail further on in this disclosure.

Thus, as illustrated in FIG. 3a, when the speed of the vehicle 100 is controlled according to previous known methods, the PnG operation may be interrupted or skipped altogether since there is not enough time to perform the operation between the time instance $T_1$ and the time instance $T_6$ when the speed reduction to the decreased speed $v_d$ is to be commenced. The conventional PnG operation may, for example, be interrupted at the time instance $T_5$, i.e., prior to the speed reduction to the decreased speed $v_d$ is to be commenced, as illustrated in FIG. 3a. In case the conventional PnG operation is interrupted, or finished, very close to the upcoming speed reduction as illustrated in FIG. 3a it may result in unexpected short periods of propulsive torque as illustrated by the dashed line between the time instances $T_5$ and $T_6$, causing a jerky ride and leading to less comfortable driving experience.

Instead, the invention adjusts the PnG operation such that an adjusted PnG operation is performed. An adjusted PnG operation may here be understood as a PnG operation wherein one or more parameters of the PnG operation, such as the maximum target speed, the minimum target speed, and/or the duration of a speed phase, has been adjusted by the invention. The PnG operation may be adjusted according to step 220 of method 200. The PnG operation may thus be adjusted such that the speed reduction to the decreased speed $v_d$ is carried out immediately following a speed increase in the pulse-phase to at least the first speed $v_1$, i.e, at time instance $T_4$ in FIG. 3a. Moreover, the invention adjusts the PnG operation such that no propulsive torque is applied during the speed reduction to the decreased speed $v_d$.

In an embodiment, the speed reduction to the decreased speed $v_d$ may be carried out by the glide-phase commencing immediately following the speed increase in the pulse-phase to at least the first speed $v_1$, and wherein the speed of the vehicle 100 is reduced to the decreased speed $v_d$ during the adjusted glide-phase. An example of such a glide-phase is illustrated in FIG. 3a, showing the vehicle speed controlled according to the invention as the solid line between the time instance $T_1$ and the time instance $T_8$. The adjusted PnG operation comprises here the glide phase between the time instance $T_4$ and the time instance $T_8$ during which the speed of the vehicle 100 is reduced from the first speed $v_1$ to the decreased speed $v_d$. Thus, the glide-phase may be adjusted based on a number of parameters to enable the vehicle speed reaching the decreased speed $v_d$ exactly at the required location, i.e. at the time instance $T_8$. In an embodiment, the adjusting of the PnG operation may be based on a position where the decreased speed $v_d$ is to be reached so as to enable the vehicle speed reaching the decreased speed $v_d$ exactly at the required location, i.e. at the time instance $T_8$ in FIG. 3a. Such a position, or a time instance, where the decreased speed $v_d$ is to be reached may be known in the vehicle's control arrangement 160 and may be used when controlling the vehicle speed according to the method of the invention. Moreover, the glide-phase may be adjusted such that it does not end when the vehicle speed reaches the second speed $v_2$, but instead continues to the decreased speed $v_d$.

In an embodiment, the speed reduction to the decreased speed $v_d$ may be carried out by the glide-phase commencing immediately following the speed increase in the pulse-phase to at least the first speed $v_1$ transitioning into the speed reduction to the decreased speed $v_d$. Thus, the adjusting of the PnG operation may instead be done based on the position, or the time instance, when the speed reduction from the set speed $v_{set}$ to the decreased speed $v_d$ is to be commenced. As previously explained, such position may be known in the vehicle's control arrangement 160 and may be used when controlling the vehicle speed according to the method of the invention. The glide-phase may here be adjusted to meet the exact location where the speed reduction is to be commenced, i.e. at the time instance $T_6$ in FIG. 3a, whereafter the anticipated speed reduction to the decreased speed is performed. Thus, the glide-phase may be adjusted such that it does not end when the vehicle speed reaches the second speed $v_2$, but when the vehicle speed reaches the set speed $v_{set}$. The speed reduction from the at least first speed may thus by performed as a sequence of speed reductions without interruption from at least the first speed to the decreased speed.

The PnG operation may be adjusted in a number of different ways without deviating from the scope of the invention which will be explained in more detail with reference to FIGS. 3a-3c.

In an embodiment, the adjusting of the PnG operation may comprise adjusting the point in time when the adjusted PnG operation is to be commenced such that the speed reduction to the decreased speed $v_d$ commences immediately following a speed increase in the pulse-phase to at least the first speed $v_1$. Thus, the PnG operation may be adjusted to comprise an adjusted pulse-phase i.e., a pulse-phase during which the speed of the vehicle is increased to the first speed $v_1$, or to a speed higher than the first vehicle speed as will be explained further on. Such pulse-phase is illustrated in FIG. 3a as the solid line between the time instances $T_2$ and $T_4$, wherein the adjusted pulse-phase commences at an adjusted point in time, i.e., the time instance $T_2$, compared to the point in time the conventional pulse-phase would have started, i.e., the time instance $T_1$ in FIG. 3a.

In an embodiment, adjusting of the point in time when the adjusted PnG operation is to be commenced may comprise commencing the adjusted PnG operation at a later point in time than the first point in time $T_1$, at which point in time the conventional, not adjusted PnG operation would have commenced as illustrated in FIG. 3a. Commencing the adjusted PnG operation at a later point in time than the first point in time $T_1$ may be, for example, done by controlling the speed of the vehicle 100 to temporarily maintain the set vehicle speed $v_{set}$ at a constant level between the time instance $T_1$ and the time instance $T_2$.

In other words, the commencing of the adjusted pulse-phase may be delayed during a time period between the time instance $T_1$ and the time instance $T_2$. The time period during which the commencing of the adjusted pulse-phase is delayed, i.e., the adjusted starting point of the adjusted pulse-phase, may depend on the position, or the time instance, where the speed reduction from the set speed $v_{set}$ to the decreased speed $v_d$ is to be commenced as well as on the time is takes to reduce the vehicle speed from at least the first vehicle speed $v_1$ to the set speed $v_{set}$ during the adjusted glide-phase immediately following the above mentioned pulse phase, i.e. the time between the time instance $T_4$ and the time instance $T_6$. Alternatively, the point in time when the adjusted PnG operation is to be commenced may depend on the position, or the time instance, when the speed reduction from the set speed $v_{set}$ to the decreased speed $v_d$ is to be reached as well as on the time is takes to reduce the vehicle speed from at least the first vehicle speed $v_1$ to the decreased speed during an adjusted glide-phase immediately following the above mentioned pulse phase. Moreover, the time period during which the commencing of the adjusted pulse-phase is delayed, may depend on the acceleration of the vehicle 100 during the pulse-phase which may in turn depend on factors such as vehicle powertrain, vehicle weight, aerodynamic drag, and road conditions. Using a more powerful powertrain, a lighter weight, a more aerodynamic design, and a smooth, level road a more efficient acceleration may be reached during the pulse-phase than a vehicle with a less powerful powertrain, a heavier weight, a less aerodynamic design, and a rough or hilly road.

In an embodiment, the PnG operation may comprise a pulse-phase with a first duration D1 and the adjusting of the PnG operation may comprise adjusting the duration of the pulse-phase such that the reduction of the speed to the decreased speed $v_d$ commences immediately following a speed increase in the adjusted pulse-phase to at least the first speed $v_1$. The duration of the pulse-phase may be adjusted in a number of different ways as will be explained with reference to FIGS. 3b and 3c.

Figure 3B:
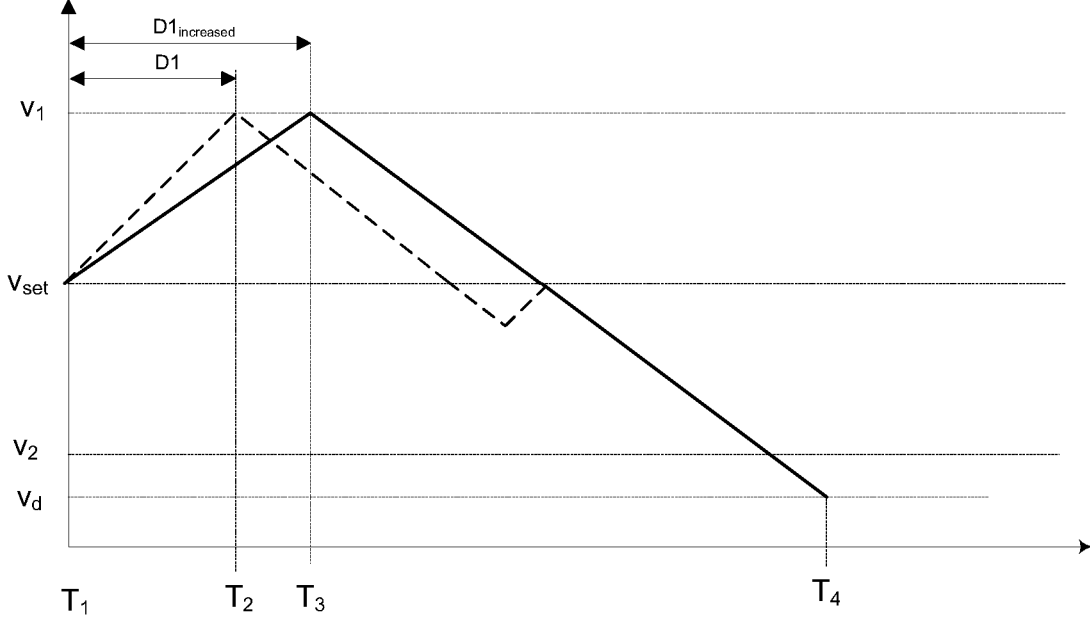
FIG. 3b illustrates a non-limiting example of adjusting a PnG operation according to embodiments of the invention.
Figure 3C:
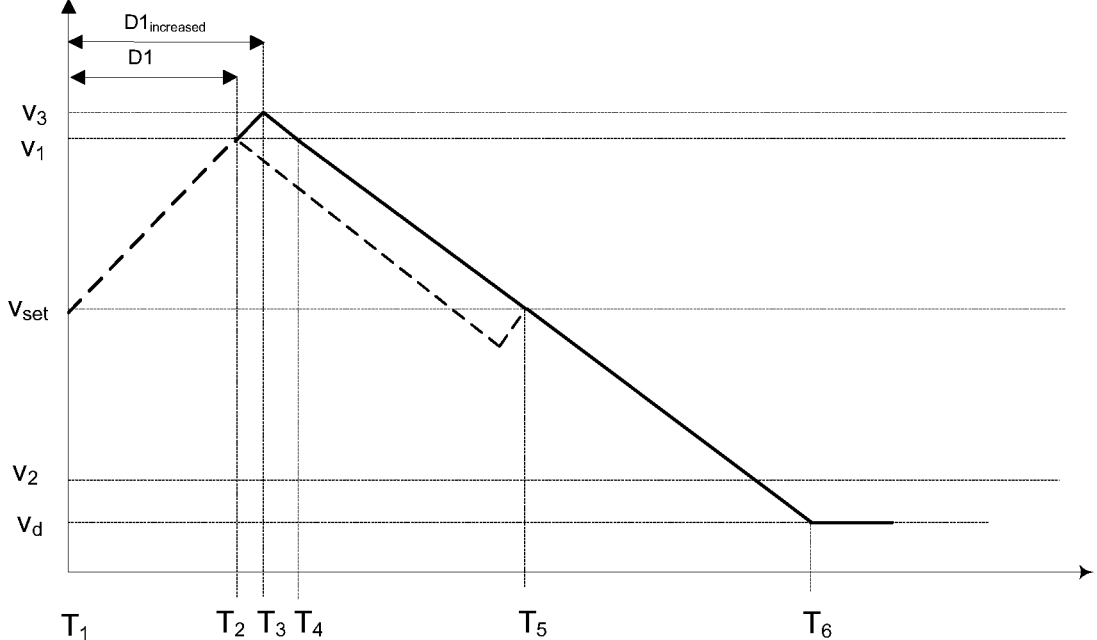
FIG. 3c illustrates a non-limiting example of adjusting a PnG operation according to further embodiments of the invention.

FIGS. 3b and 3c show thus further ways of adjusting the PnG operation by adjusting a duration of the pulse-phase according to embodiments of the invention. The non-limitative examples of controlling the speed of the vehicle 100 shown in FIG. 3b relate to the same driving scenario as in FIG. 3a. Thus, in similar manner as in FIG. 3a, the dashed lines in FIGS. 3b and 3c show the speed of the vehicle 100 maintained by means of a conventional PnG operation, while the solid line shows the speed of the vehicle 100 controlled according to the method of the invention. As shown in FIG. 3b, the conventional PnG operation comprises a pulse-phase with a first duration D1.

In an embodiment, the adjusting of the duration of the pulse-phase may comprise increasing or decreasing the duration of the pulse-phase compared to the first duration D1. Such increase or decrease of the duration of the pulse-phase may depend on the point in time when the speed decrease to the decreased speed $v_d$ is to be reached or when the speed reduction to the decreased speed $v_d$ is to be commenced as will be explained further on.

An example where the PnG operation is adjusted by increasing the duration of the pulse-phase is shown in FIG. 3b. Here a speed reduction from the first speed $v_1$ to the decreased speed $v_d$ is illustrated as the solid line and commences at the time instance $T_3$. The conventional PnG operation, illustrated as the dashed line, would have reached the first speed $v_1$ at the time instance $T_2$, i.e., prior to the time instance $T_3$. Thus, by increasing the duration of the pulse-phase to an increased duration D1$_{increased}$, the first speed $v_1$ is instead reached at the time instance $T_3$ resulting in the reduction of the speed to the decreased speed $v_d$ may commence immediately following the speed increase in the adjusted pulse-phase to at least the first speed $v_1$.

The duration of the pulse-phase may be adjusted by adjusting the acceleration of the vehicle 100 during the pulse-phase. The duration of the pulse-phase may be increased by decreasing the vehicle's acceleration during the pulse-phase which may be obtained by decreased torque demand from the vehicle's power source 101 reducing the available torque to the vehicle's drive wheels. In similar fashion, the duration of the pulse-phase may be decreased by faster acceleration during the pulse-phase which may be obtained by increased torque demand from the vehicle's power source 101. Such increase or decrease the duration of the pulse-phase may depend on the point in time when the speed decrease to the decreased speed $v_d$ is to be reached or when the speed reduction to the decreased speed $v_d$ is to be commenced as will be explained further on.

In an embodiment, the duration of the pulse-phase may be, instead, or furthermore, adjusted by increasing the speed of the vehicle 100 to a speed above the first speed $v_1$ as will be explained with reference to FIG. 3c. Here, the speed reduction to the decreased speed $v_d$ immediately following the speed increase in the pulse-phase is illustrated as the solid line. As previously explained, the glide-phase in the adjusted PnG operation may be adjusted to meet the coming speed reduction to the decreased speed $v_d$ at the time instance $T_5$ or the time instance when the decreased speed $v_d$ is to be reached, i.e., at the time instance $T_6$. The glide-phase needs, for example, to be adjusted such that the speed reduction from the first speed $v_1$ starts at the time instance $T_4$. The conventional PnG operation, illustrated as the dashed line starting at the time instance $T_1$ with a conventional pulse-phase, would have reached the first speed $v_1$ at the time instance $T_2$, i.e., prior to the time instance $T_4$. However, by increasing the speed of the vehicle 100 during an adjusted pulse-phase between the time instance $T_1$ and the time instance $T_3$, to an increased speed $v_3$ higher than the first speed $v_1$, the glide-phase may be adjusted to instead start at the time instance $T_3$ at the increased speed $v_3$ and in such a way meet the coming speed reduction to the decreased speed $v_d$.

Such increase of the duration of the pulse-phase may depend on the point in time when the speed decrease to the decreased speed $v_d$ is to be reached or on the point in time when the speed reduction to the decreased speed $v_d$ is to be commenced as will be explained further on.

In addition to the method step 220 described with reference to FIG. 2a, the method 200 may in an embodiment comprise an optional step 210. FIG. 2b shows a flowchart of the method 200 according to an embodiment of the invention.

In step 210 in FIG. 2b, preceding the previously described step 220 where the PnG operation is adjusted, it is determined whether the speed reduction to the decreased speed $v_d$ will need to be commenced during the PnG operation at least partly based on information related to an upcoming road section for the vehicle 100. The speed reduction to the decreased speed $v_d$ may need to be commenced during the PnG operation based on if the upcoming road section includes one or more downhill road sections, one or more curves, one or more stretches with slow moving traffic and/or an upcoming legal speed limit. Based on such information, the invention may determine if a coming speed reduction to the decreased speed $v_d$ is anticipated and, if so, when such speed reduction is to take place.

In an embodiment, the information related to the upcoming road section may be obtained in various ways. It may be determined on the basis of map data, e.g. from digital maps including e.g. topographical information, in combination with positioning information, e.g. Global Positioning System (GPS) information. The positioning information may be used to determine the location of the vehicle relative to the map data so that the road section information may be extracted from the map data. Various present-day cruise control systems use map data and positioning information. Such systems may then provide the system for the present invention with map data and positioning information, thereby minimizing the additional complexity involved in determining the information related to the upcoming road section.

The information related to the upcoming road section may thus e.g. be obtained on the basis of a map in conjunction with GPS information. The information may also be obtained by usage of radar equipment, one or more cameras, one or more other vehicles providing information, information storing systems on board, and/or traffic systems related to the section of road.

As previously explained, to properly adjust the PnG operation according to the method of the invention, a number of parameters need to be determined. Example of such parameters are the adjusted point in time when an adjusted PnG operation is to be commenced, an adjusted duration of an adjusted pulse-phase, and/or an adjusted increased speed $v_3$ reached in an adjusted pulse-phase. These parameters may be determined based on conventional methods taking into consideration the position where the decreased speed $v_d$ is to be reached as well as information related to acceleration during the pulse-phase of the PnG operation and the kinetic energy gained during the pulse-phase. For example, by using Newton's laws of motion the vehicle speed during the adjusted pulse-phase may be calculated based on parameters like the vehicle's mass, speed, and the inclination of the road in front of the vehicle to mention a few. Based on the calculated vehicle speed, the position or point in time when the adjusted glide-phase may be commenced such that the decreased speed $v_d$ is reached at the required position/point in time. Based on this position or point in time the above-mentioned parameters may be calculated.

According to an aspect of the invention, a control arrangement 160 for controlling a speed of a vehicle 100, the vehicle 100 being configured for carrying out a PnG operation, the PnG operation controlling the speed of a vehicle about a reference speed, and comprising a pulse-phase during which the speed of the vehicle 100 is increased to a first speed $v_1$, higher than the reference speed, followed by a glide-phase during which the speed of the vehicle 100 is allowed to decrease to a second speed $v_2$, lower that the reference speed.

The control arrangement 160 includes means 161 arranged for, when the PnG operation is to be carried out, and when a speed reduction to a decreased speed $v_d$, lower than the reference speed, is to be commenced during the PnG operation, adjust 220 the PnG operation such that the speed reduction to the decreased speed $v_d$ is carried out immediately following a speed increase in the pulse-phase to at least the first speed $v_1$, and wherein no propulsive torque is applied during the speed decrease.

The control arrangement 160, e.g. a device or a control device, according to the invention may be arranged for performing all of the above, in the claims, and in the herein described embodiments method steps. The control arrangement 160 is hereby provided with the above described advantages for each respective embodiment.

The invention is also related to a vehicle 100 including the control arrangement 160.

Figure 4:
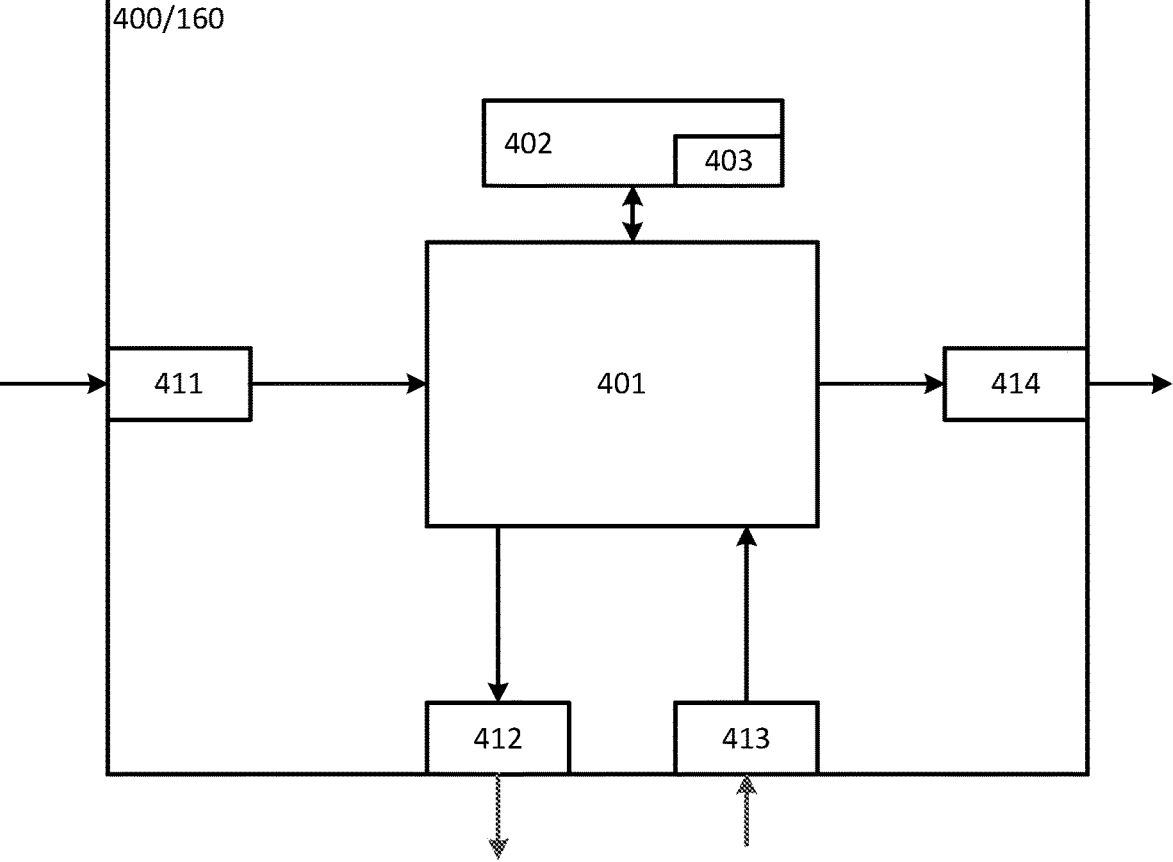
FIG. 4 shows a control arrangement, in which a method according to any one of the herein described embodiments may be implemented.

Now turning to FIG. 4 which illustrates the control arrangement 400/160, which may correspond to or may include one or more of the above-mentioned control unit 161, i.e. the control units performing the method steps of the disclosed invention. The control arrangement 400/160 comprises a computing unit 401, which can be constituted by essentially any suitable type of processor or microcomputer, e.g. a circuit for digital signal processing (Digital Signal Processor, DSP), or a circuit having a predetermined specific function (Application Specific Integrated Circuit, ASIC). The computing unit 401 is connected to a memory unit 402 arranged in the control arrangement 400/160, which memory unit provides the computing unit 401 with, e.g., the stored program code and/or the stored data which the computing unit 401 requires to be able to perform computations. The computing unit 401 is also arranged to store partial or final results of computations in the memory unit 402.

In addition, the control arrangement 400/160 is provided with devices 411, 412, 413, 414 for receiving and transmitting input and output signals. These input and output signals can contain waveforms, impulses, or other attributes which, by the devices 411, 413 for the reception of input signals, can be detected as information and can be converted into signals which can be processed by the computing unit 401. These signals are then made available to the computing unit 401. The devices 412, 414 for the transmission of output signals are arranged to convert signals received from the computing unit 401 in order to create output signals by, e.g., modulating the signals, which can be transmitted to other parts of and/or systems in the vehicle 100.

Each of the connections to the devices for receiving and transmitting input and output signals can be constituted by one or more of a cable; a data bus, such as a Controller Area Network CAN bus, a Media Orientated Systems Transport MOST bus, or some other bus configuration; or by a wireless connection. A person skilled in the art will appreciate that the above-stated computer can be constituted by the computing unit 401 and that the above-stated memory can be constituted by the memory unit 402.

Control systems in modern vehicles commonly comprise communication bus systems consisting of one or more communication buses for linking a number of electronic control units, ECU's, or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1 and 4, which is well known to the person skilled in the art within this technical field.

In a shown embodiment, the invention may be implemented by the one or more above mentioned control unit 161. The invention can also, however, be implemented wholly or partially in one or more other control units already in the vehicle 100, or in some control unit dedicated to the invention.

Here and in this document, units are often described as being arranged for performing steps of the method according to the invention. This also includes that the units are designed to and/or configured to perform these method steps.

The control unit 161 is in FIG. 1 illustrated as one unit. This and other units may, however, be logically separated but physically implemented in the same unit or can be both logically and physically arranged together. These units may e.g. correspond to groups of instructions, which can be in the form of programming code, that are input into, and are utilized by a processor/computing unit 401 when the units are active and/or are utilized for performing its method step, respectively.

The person skilled in the art will appreciate that the herein described embodiments for controlling the speed of a vehicle may also be implemented in a computer program, which, when it is executed in a computer, instructs the computer to execute the method. The computer program is usually constituted by a computer program product 403 stored on a non-transitory/non-volatile digital storage medium, in which the computer program is incorporated in the computer-readable medium of the computer program product. The computer-readable medium comprises a suitable memory, such as, e.g.: Read-Only Memory ROM, Programmable Read-Only Memory PROM, Erasable PROM EPROM, Flash memory, Electrically Erasable PROM EEPROM, a hard disk unit, etc.

The invention is not limited to the above described embodiments. Instead, the invention relates to, and encompasses all different embodiments being included within the scope of the independent claims.

The invention claimed is:

1. A method performed by a control arrangement for controlling a speed of a vehicle, the vehicle being configured for carrying out a Pulse and Glide operation, the Pulse and Glide operation controlling the speed of the vehicle about an initial reference speed, and comprising a pulse-phase during which the speed of the vehicle is increased to a first off-set speed, higher than the initial reference speed, followed by a glide-phase during which the speed of the vehicle is allowed to decrease to a second off-set speed, lower than the initial reference speed, the method comprising, when the Pulse and Glide operation is to be carried out, and when a speed reduction request is received to set the initial reference speed to a decreased speed value, lower than the initial reference speed during the Pulse and Glide operation:

adjusting the Pulse and Glide operation such that the speed reduction to the decreased speed value is carried out immediately following a speed increase in the pulse-phase to at least the first off-set speed, wherein no propulsive torque is applied during the speed decrease.

2. The method according to claim 1, wherein the speed reduction to the decreased speed value is carried out by the glide-phase commencing immediately following the speed increase in the pulse-phase to at least the first off-set speed, and wherein the speed of the vehicle is reduced to the decreased speed value during the adjusted glide-phase.

3. The method according to claim 1, wherein the speed reduction to the decreased speed value is carried out by the glide-phase commencing immediately following the speed increase in the pulse-phase to at least the first off-set speed transitioning into the speed reduction to the decreased speed value.

4. The method according to claim 1, wherein the initial reference speed is a set vehicle speed and wherein the reduction of the vehicle speed to the decreased speed value is to be performed when the set vehicle speed is reset to the decreased speed value or when the vehicle is approaching a downhill road section.

5. The method according to claim 1, wherein the adjusting of the Pulse and Glide operation comprises, when the Pulse and Glide operation is to be commenced at a first point in time, adjusting the point in time when the adjusted Pulse and Glide operation is to be commenced such that the speed reduction to the decreased speed value commences immediately following a speed increase in the pulse-phase to at least the first off-set speed.

6. The method according to claim 5, wherein the adjusting of the point in time when the adjusted Pulse and Glide operation is to be commenced comprises commencing the adjusted Pulse and Glide operation at a later point in time than the first point in time.

7. The method according to claim 1, wherein the Pulse and Glide operation comprises a pulse-phase with a first duration, and wherein the adjusting of the Pulse and Glide operation comprises adjusting the duration of the pulse-phase such that the reduction of the speed to the decreased speed value commences immediately following a speed increase in the adjusted pulse-phase to at least the first off-set speed.

8. The method according to claim 7, wherein the adjusting of the duration of the pulse-phase comprises increasing or decreasing the duration of the pulse-phase compared to the first duration.

9. The method according to claim 7, wherein the adjusting of the duration of the pulse-phase comprises increasing the speed of the vehicle to a speed above the first off-set speed.

10. The method according to claim 1, further comprising:

determining whether the speed reduction to the decreased speed value will need to be commenced during the Pulse and Glide operation at least partly based on information related to an upcoming road section for the vehicle.

11. The method according to claim 10, wherein the information related to the upcoming road section is obtained from at least one of:

map data for the upcoming road section, at least one sensor in the vehicle, and/or information received from an external entity.

12. The method according to claim 1, wherein the adjusting of the Pulse and Glide operation is further based on a position where the decreased speed value is to be reached.

13. The method according to claim 1, when a second vehicle is travelling in front of the vehicle, wherein the first off-set speed and the second off-set speed depend on a set distance interval to be maintained to the second vehicle in front of the vehicle.

14. A control arrangement for controlling a speed of a vehicle, the vehicle being configured for carrying out a Pulse and Glide operation, the Pulse and Glide operation controlling the speed of the vehicle about an initial reference speed, and comprising a pulse-phase during which the speed of the vehicle is increased to a first off-set speed, higher than the initial reference speed, followed by a glide-phase during which the speed of the vehicle is allowed to decrease to a second off-set speed, lower than the initial reference speed, the control arrangement being configured to, when the Pulse and Glide operation is to be carried out, and when a speed reduction request is received to set the initial reference speed to a decreased speed value, lower than the initial reference speed during the Pulse and Glide operation:

adjust the Pulse and Glide operation such that the speed reduction to the decreased speed value is carried out immediately following a speed increase in the pulse-phase to at least the first off-set speed, and wherein no propulsive torque is applied during the speed decrease.

15. A vehicle comprising a control arrangement for controlling a speed of a vehicle, the vehicle being configured for carrying out a Pulse and Glide operation, the Pulse and Glide operation controlling the speed of the vehicle about initial reference speed, and comprising a pulse-phase during which the speed of the vehicle is increased to a first off-set speed, higher than the initial reference speed, followed by a glide-phase during which the speed of the vehicle is allowed to decrease to a second off-set speed, lower than the initial reference speed, the control arrangement being configured to, when the Pulse and Glide operation is to be carried out, and when a speed reduction request is received to set the initial reference speed to a decreased speed value, lower than the initial reference speed during the Pulse and Glide operation:

adjust the Pulse and Glide operation such that the speed reduction to the decreased speed value is carried out immediately following a speed increase in the pulse-phase to at least the first off-set speed, and wherein no propulsive torque is applied during the speed decrease.

16. A computer program product comprising a computer program code stored on a non-transitory computer-readable medium, said computer program product used for controlling a speed of a vehicle, the vehicle being configured for carrying out a Pulse and Glide operation, the Pulse and Glide operation controlling the speed of the vehicle about an initial reference speed, and comprising a pulse-phase during which the speed of the vehicle is increased to a first off-set speed, higher than the initial reference speed, followed by a glide-phase during which the speed of the vehicle is allowed to decrease to a second off-set speed, lower than the initial reference speed, said computer program code comprising computer instructions to cause one or more control devices to perform the following operations when the Pulse and Glide operation is to be carried out, and when a speed reduction request is received to set the initial reference speed to a decreased speed value, lower than the initial reference speed during the Pulse and Glide operation:

adjusting the Pulse and Glide operation such that the speed reduction to the decreased speed value is carried out immediately following a speed increase in the pulse-phase to at least the first off-set speed, wherein no propulsive torque is applied during the speed decrease.

* * * * *